Figure 1:
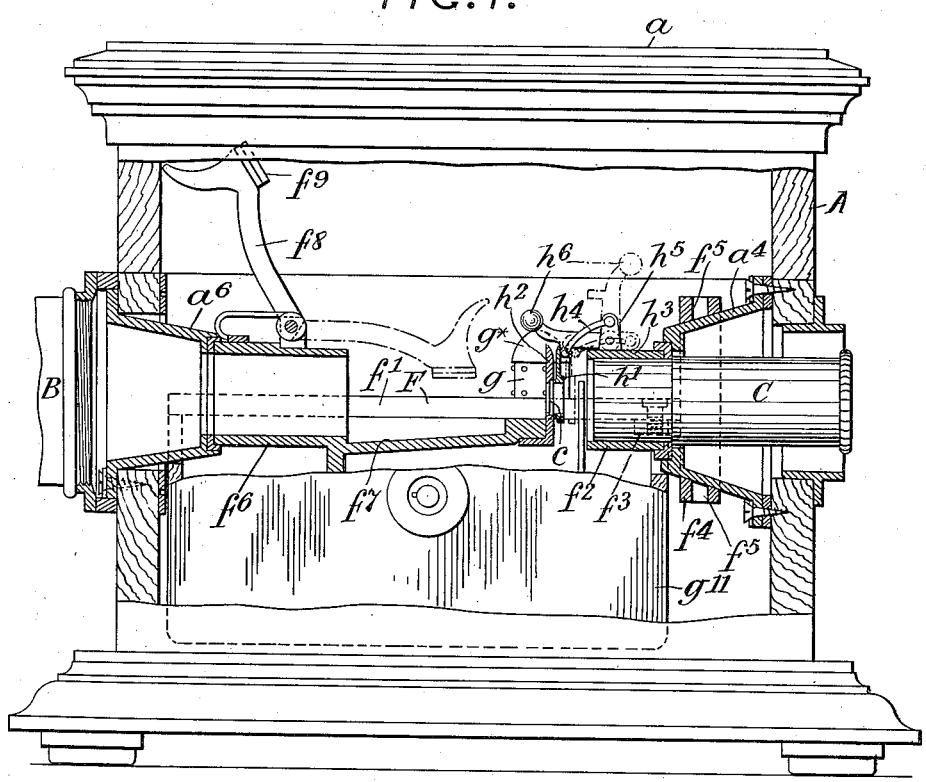

F. VON MADALER.
OPTICOPICTORIAL APPARATUS.
APPLICATION FILED APR. 24, 1913.

1,139,241.

Patented May 11, 1915.
5 SHEETS—SHEET 1.

WITNESSES.

INVENTOR.

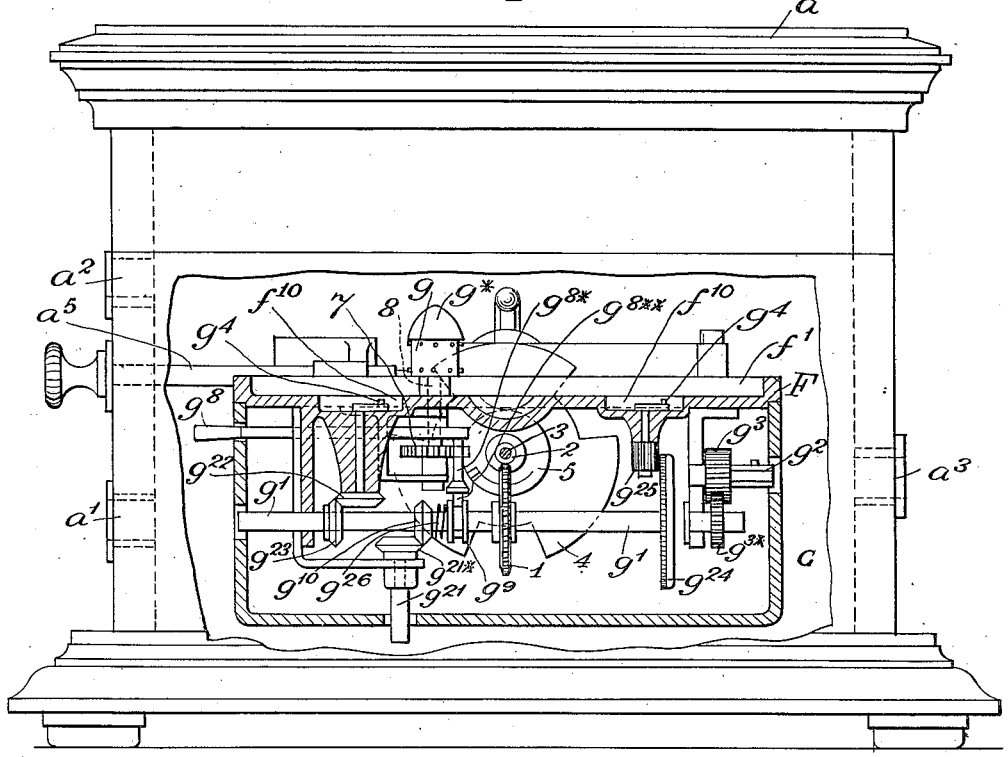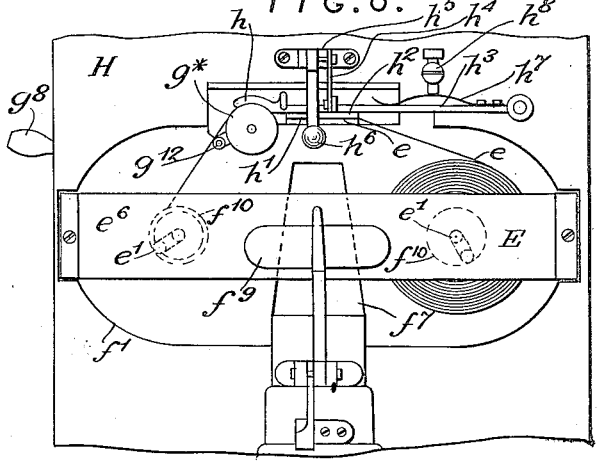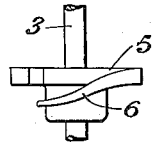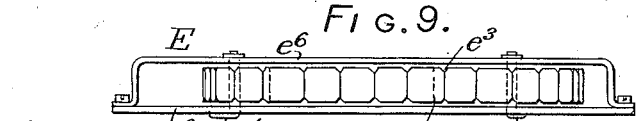

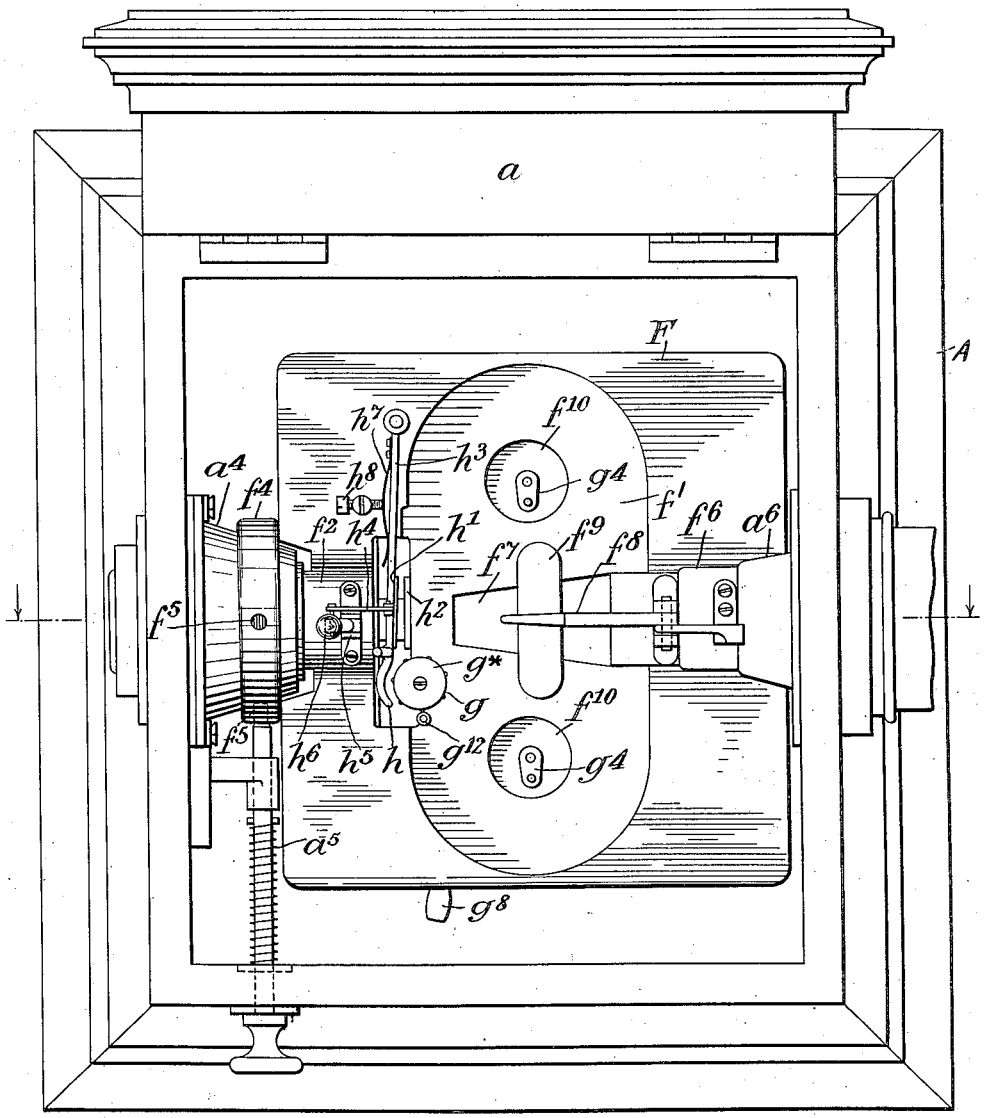

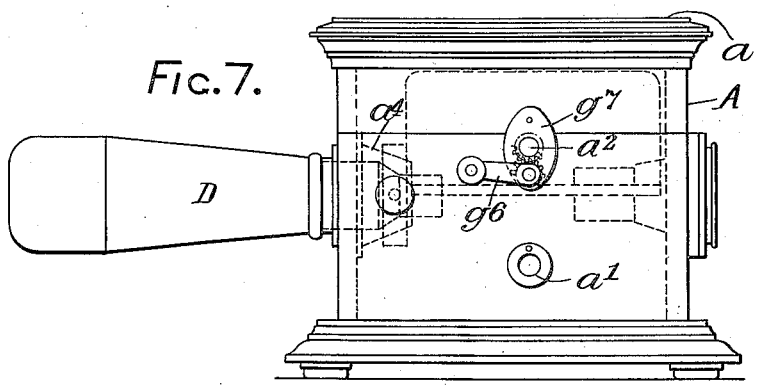
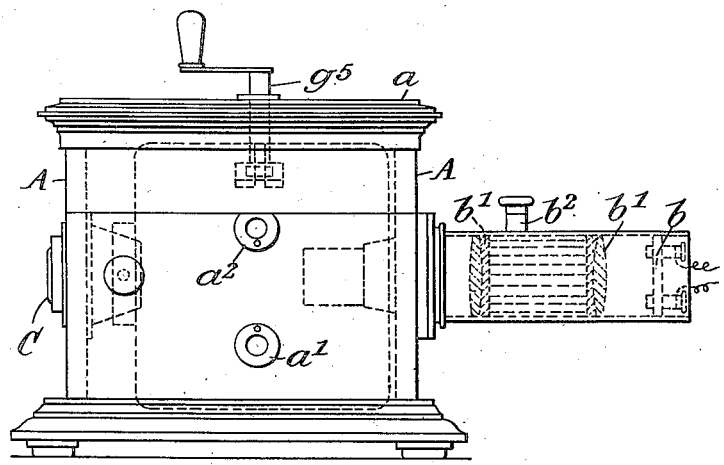
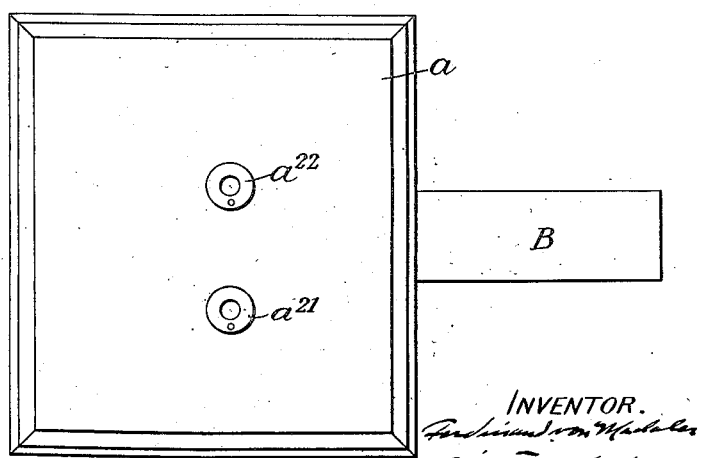

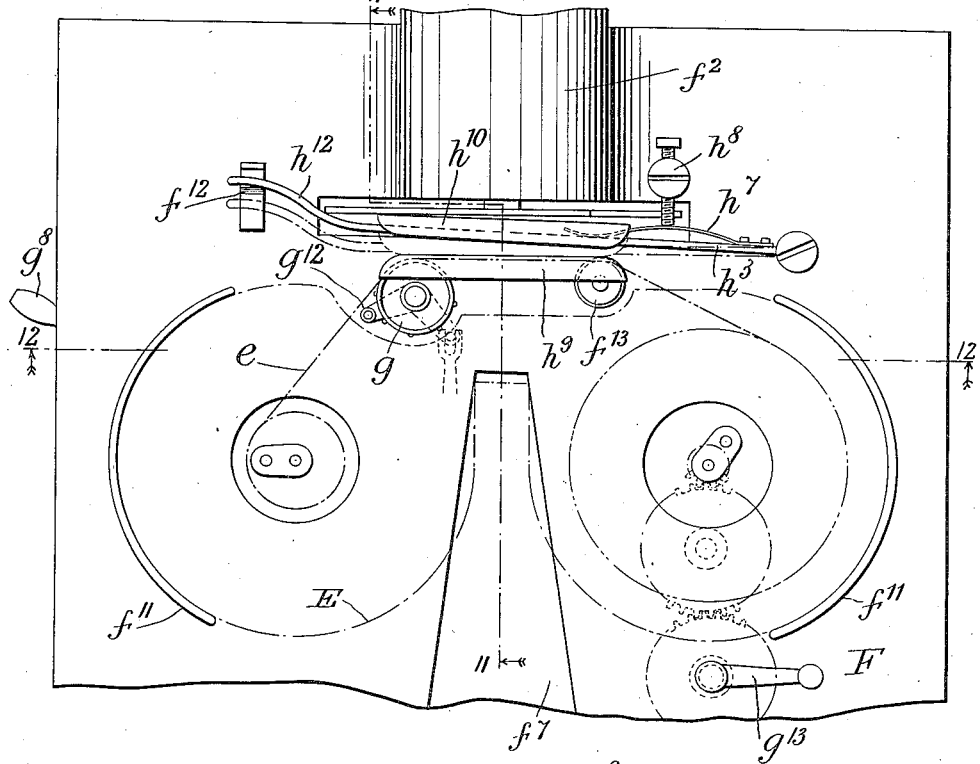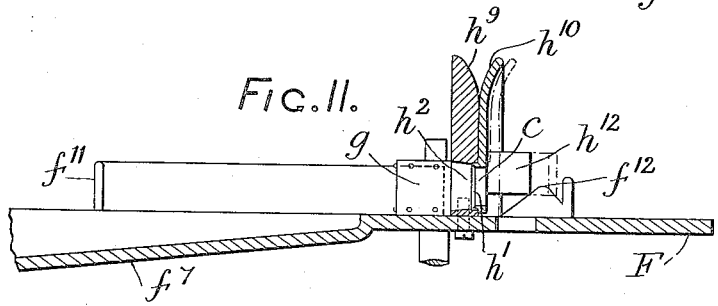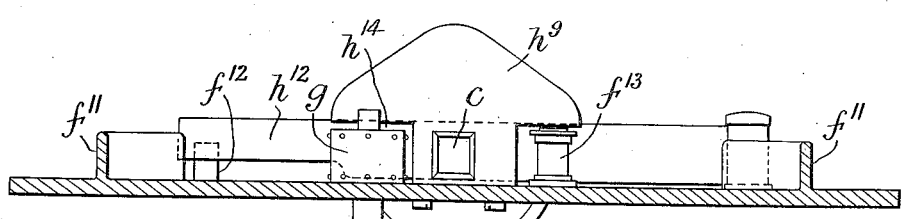

UNITED STATES PATENT OFFICE.

FERDINAND von MADALER, OF WEST DRAYTON, ENGLAND, ASSIGNOR TO THE ROTARY PHOTOGRAPHIC COMPANY, LIMITED, OF LONDON, ENGLAND, A CORPORATION OF GREAT BRITAIN AND IRELAND.

OPTICOPICTORIAL APPARATUS.

1,139,241.     Specification of Letters Patent.     Patented May 11, 1915.

Application filed April 24, 1913. Serial No. 763,434.

*To all whom it may concern:*

Be it known that I, FERDINAND VON MADALER, a subject of the Austro-Hungarian Emperor, and a resident of West Drayton, in the county of Middlesex, England, have invented a certain new and useful Improvement in Opticopictorial Apparatus, of which the following is a specification.

This invention relates to moving picture apparatus, that is to say to apparatus for projecting, for putting on view, or for taking, a succession of pictures upon a traveling film or paper strip hereinafter referred to as a film the invention being applicable whether the apparatus is being used as a cinematograph machine, that is to say to represent a moving subject, or whether it is to be used merely as a magic lantern to represent a series of varied and stationary subjects.

The invention has for one of its principal objects to enable the films to be inserted correctly in place by a single operation or movement of the hands, that is to say without the necessity of different and simultaneous movements of the two hands or of two or more motions made simultaneously; this is of advantage in a machine for household use to which the invention is more particularly directed.

Another object of the invention is to adapt the machine for use either with films having the pictures individually extending longitudinally thereof or with films having the pictures individually extending transversely thereof, as has been already suggested, but without the necessity of moving the apparatus as a whole and also with the film mounted entirely within the interior of the apparatus.

In order to attain the various objects above set forth the apparatus is provided, according to the present invention, with a device which is adapted to guide the exposed or intermediate portion of the film mechanically over the driving sprocket or pin wheel during the operation of putting the spools or the film holder on to the support, so that the film will be in position for engaging the pins of said wheel when, or immediately after, the drive begins. Said support comprises preferably a table or frame adapted to carry the driving mechanism or gear on one side thereof and the film holder, or two film spools, laid side by side, preferably on the other side thereof, in such manner that the machine will serve its various uses without the necessity of varying or adapting the manner in which the film is put into the machine; that is to say the film may always be laid upon the table in one unvarying way for all conditions or irrespective of the way in which the pictures are arranged on the film or of whether the machine is to be used for putting the pictures on view or for taking pictures, or for the relatively inverted process of projecting them. To this end the table may be the part that is adjusted to adapt the machine to the various requirements, said table being pivoted or gudgeoned within the outer box or cover in such manner as to be capable, together with whatever is supported by it, of being turned or tilted bodily about the axis of the transmission aperture; or the table may be fixed and the desired inversion or alteration obtained by prisms, lenses or mirrors.

Other features of the invention will be pointed out hereafter.

The invention will now be described more fully with reference to an embodiment thereof illustrated by way of example in the accompanying drawings, in which:—

Figure 1 is a sectional side elevation of the said exemplary apparatus; Fig. 2 is an end elevation thereof with the box partly broken away and showing the driving gear partly in section. Fig. 2ª is a detail. Fig. 3 a plan thereof with the lid of the outer box open, but without the film container, and Fig. 4 a detail of same with the film container in place; Figs. 5, 6, and 7 are respectively an elevation, a plan, and an elevation, on a smaller scale, illustrating various ways of using the apparatus; Fig. 8 is a plan of a portion of the table showing a modified form of recess and carrying a modified form of film holder; Fig. 9 is a front or edge elevation of the modified form of film holder shown in Fig. 8 and showing also the film carried thereby; Fig. 10 is a plan, on a larger scale, and partly broken away, of a further modified form of table showing also a modified form of the film driving and guiding devices; Fig. 11 is a longitudinal section thereof taken approximately on the line 11—11 of Fig. 10; and Fig. 12 is a transverse section of the same, taken approximately on the line 12—12 of Fig. 10.

In the said drawings: A represents the outer box or casing, B (Fig. 5) a condenser being a part of the lantern or lamp holder, C the lens holder of any convenient kind, D (Fig. 7) a view attachment or fitting which may take the place of the lens for daylight viewing, E the film container or box, and F the table or frame that carries said film box and the driving mechanism; while G represents as a whole that part of the mechanism, which may be of any suitable kind, comprising the driving gear, and H the film guiding means.

The box or casing A may be of any convenient kind and may have a hinged lid $a$. In the opposite side walls and in the lid of the box there are holes $a^1$, $a^2$, $a^3$, and $a^{21}$, $a^{22}$ respectively, which permit of the insertion of the hand crank hereinafter referred to.

The lamp may be of any convenient kind such as electric, gas, or spirit. It is placed outside the box A and its light is preferably directed through a water cooled condenser B in the well known way, which condenser may form with the lamp a single fitting. In Fig. 5 the condenser B is shown provided with a Nernst lamp at $b$, a cooling medium such as water between its two lenses $b^1$ $b^1$, and a nozzle and screw cap $b^2$ to facilitate the introduction or removal of such cooling medium.

Figure 4:
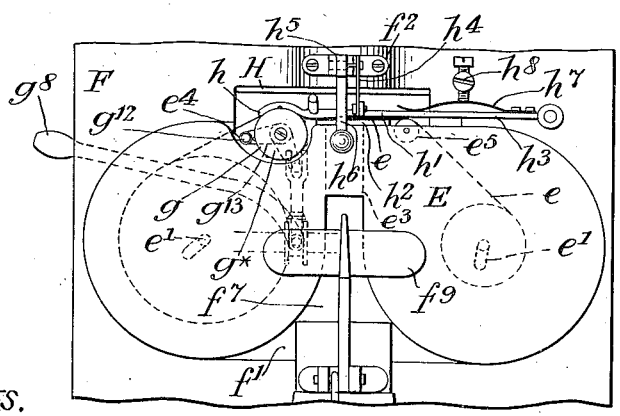

The film box E is preferably as described in Patent No. 1,100,591, dated 16th June, 1914; it is adapted to accommodate two spools on which is wound the film $e$, and is provided with two spindles $e^1$ $e^1$ Fig. 4, projecting out through the bottom of the box and having each a cranked end adapted to be engaged by cranks $g^4$ $g^4$ on the winding spindles of the mechanism G which seat in recesses $f^{10}$ in the depression $f^1$ of the table F. As described in my said specification, the film box has a passage or tunnel $e^3$, see Fig. 4 of the accompanying drawings, extending therethrough midway between the spools, for the transmission of the light from the lamp, a recess $e^4$ at its forward edge to accommodate the film-driving member, and a guide roller $e^5$; further description in the present specification of the film box is unnecessary. Or, in place of the film box, the spools may be provided with any rigid spacing device as for instance as shown in Fig. 8, a bar or bars $e^6$ separating their spindles, and also if desired with a cross bar or bars so arranged as to protect the coils of the film; in such case the recess or depression $f^1$ may be correspondingly shaped to suit the modified form of film holder, and the guide roller $e^5$ may be dispensed with.

The table F is pivoted on gudgeons $f^2$ $f^6$ on an axis which passes centrally through the transmission aperture $c$ and which in the example shown coincides with the axis of the shaft of light from the lamp B to the lens C. On what may herein be termed its reverse side the table F carries the driving gear or mechanism G, Fig. 2, and on other or obverse side thereof it has a depression or sunken area $f^1$, Fig. 3, of such shape and size as to accommodate snugly the film box E. The driving mechanism comprises a horizontal shaft $g'$ on which is a worm wheel 1 that gears with a worm 2 on a transverse shaft 3 fast on which is a Maltese cross shutter 4 and a wheel 5 having a cam tooth 6 (Fig. 2$^a$) that engages with a tooth or star wheel 7 on the spindle 8 of the driving sprocket wheel $g$. The cam tooth 6 turns the sprocket wheel $g$ through an angle sufficient to change the picture at each complete revolution of the shaft 3. The shaft $g'$ is mounted so as to be slidable in an axial direction so as to bring either a bevel wheel $g^{23}$ into engagement with a bevel wheel $g^{22}$ to drive the spools in one direction, or to bring a crown wheel $g^{24}$ into engagement with a pinion $g^{25}$ to drive the spools in the opposite direction. The shifting of the shaft $g'$ is effected by means of a reversing arm $g^8$ mounted on a vertical spindle $g^{8x}$ to which another arm $g^{8xx}$ is fixed; said arm $g^{8xx}$ having a forked end which engages a collar $g^9$ on the shaft $g'$. The spindle $g^{8x}$ carries also an arm $g^{9x}$ which has a forked end that engages one arm of a bell crank lever $g^{13}$ the other arm of which carries a roller $g^{12}$ which when the reversing arm $g^8$ is actuated is moved into the path of the film so as to disengage the latter from the sprocket wheel and thus permit the film to be wound backward or in the reverse direction. The shaft $g'$ may be driven by means of a hand crank direct, or through the spindle $g^2$ and gears $g^3$ and $g^{3x}$, or through the spindle $g^{21}$ and bevel wheels $g^{21x}$, $g^{10}$. The bevel wheel $g^{10}$ is slidable on the shaft $g'$ and a spring $g^{26}$ is interposed between this bevel wheel and the collar $g^9$ so as to maintain the bevel gears $g^{21x}$ $g^{10}$ in constant engagement, notwithstanding the shifting of the shaft $g'$. As this driving mechanism is of well known construction no further description is necessary in this specification. At or near the forward edge of the depression $f^1$ is the sprocket or pin-wheel $g$ which drivingly engages the film $e$; and an important feature of said pin wheel, according to the present invention, is that it is extended upwardly in the form of a cone or conical dome $g^x$ or like tapered extension which serves in part to guide the film $e$ into place when the film box and film are introduced into the machine. This latter operation is performed in a single movement and without the necessity of touching the film by hand for fitting it on to the sprocket pins, the film box, held between the finger and thumb, being dropped, or lightly pressed, into the depression $f^1$ formed for its reception in the surface of the table, so that the tip of the cone $g^x$ enters the recess $e^4$ in the film box, and the film slides downwardly over said cone and into a position opposite to the pin wheel $g$ and between said pin wheel and a curved front guide $h$, so that the notches or perforations of the film drop onto the pins either at once or immediately upon the first movement of the film. This guide $h$ and a pair of co-acting plate guides $h^1$ $h^2$ both pierced by windows and located centrally with respect to the lens, guide the travel of the film across the lens; and of these guides, the curved guide $h$ and plate guide $h^1$ which are on a common pivoted arm $h^3$ are operated by a lever $h^4$ which latter is at one end connected to the arm $h^3$ and at the other to a crank $h^5$ on a hand lever $h^6$ which is capable of normally lying in the two positions indicated in Fig. 1. The arm $h^3$ is controlled by a spring $h^7$ the tension of which is adjustable by a screw $h^8$.

When there is no film in the machine, the hand lever $h^6$ is in its raised position, and the movable guides $h$ and $h^1$ are amply spaced from the pin-wheel $g$ and the fixed guide $h^2$ respectively to leave a comparatively wide or open passage into which the film can drop: when the hand lever $h^6$ is lowered, the movable guides $h$ and $h^1$ narrow or close such passage and press the film into place against the pin-wheel and the fixed guide respectively, such action being assisted by the spring $h^7$.

The film $e$ is preferably provided with notches on its edges in place of holes for the pins of the sprocket or driving wheel but the perforated form may be used if desired. Where notches are provided I prefer to locate each pair of notches between one picture and the next, as indicated in Fig. 9, this arrangement having the advantage that it saves film space and also suits that kind of film in which the pictures have rounded or otherwise shaped or ornamented corners.

The table F has a tubular gudgeon $f^2$ embracing and supporting, and also co-axial with, the lens holder C. Said gudgeon is rotatably supported in a fixed annular bracket or bearing member $a^4$ on an end wall of the box A and is rigidly connected by brackets or connecting pieces one of which is shown at $f^3$ Fig. 1 with a collar $f^4$ loosely surrounding the bearing member $a^4$. Said collar has a series, corresponding in number with the various positions in which the table is to be used, of holes or depressions $f^5$ (in this instance four) adapted to be engaged, each as it comes into the position for such engagement, by a spring-controlled dog or plunger $a^5$ carried by the walls of the box A, and having a knob or handle for operating it outside of the box. This plunger by its engagement insures the table being correctly positioned; that is, it insures that the exposed picture on the film will be correctly placed and upright relatively to the transmission aperture $c$; and it also prevents accidental angular movement of said table. At its opposite end, that is to say at the end near the lantern, the table F has another tubular gudgeon $f^6$ rotatably mounted in a bearing member $a^6$ fixed upon the adjacent wall of the box A. Said tubular gudgeon and bearing member, as well as the corresponding parts at the other end, are of sufficient internal diameter to transmit the whole of the beam of light from the lantern; also, to avoid interception of any effective portion of such beam of light, the table F has a further depression $f^7$ below the level of the bottom of the depression $f^1$ that receives the film box, so that the portion of the beam of light below the level of the film box can pass under said film box to the transmission aperture $c$.

The table F has in the present instance four different positions corresponding with the four different ways in which it is intended to be capable of being used, namely, first, horizontal with its obverse facing upward, secondly, horizontal with its obverse facing downward, thirdly vertical with its obverse facing, say left, and fourthly, with its obverse facing, say right. The first of these positions may be suited for, say, projecting from a film on which the upright of the pictures extends transversely of the film, the second for viewing pictures of the same kind, the third for, say, projecting from a film on which the upright of the pictures extends longitudinally of the film, and the fourth for viewing pictures of the last mentioned kind. Suitably mounted on the table F is a spring controlled hand operated presser device such as a hinged arm $f^8$ having a presser pad $f^9$ adapted, when said arm is lowered, to press upon the upper surface of the film holder or the spools so as to prevent the latter from falling away when the table is overturned.

The drive will be effected from that part of the box (either side or lid) that best suits the kind of film and the position of the table; and preferably the driving gear is so arranged as to permit the drive to take place in the same direction for all four positions of the table. For this purpose the machine is shown with three driving spindles $g^1$, $g^2$, $g^{21}$ adapted respectively to come opposite to the holes $a^1$ or $a^3$ in the side or $a^{21}$ $a^{22}$ in the lid of the box. In Fig. 5 a simple hand crank is shown at $g^5$ in position for operating through the lid $a$ onto the spindle $g^2$ if top driving is desired.

The apparatus may, as has already been proposed with analogous apparatus, have means for facilitating its use as a simple magic lantern. The preferred form of such a device may comprise a hand crank $g^6$ having a reducing or other gear box $g^7$ fixable to the casing and having means such as a spring latch adapted to snap into a hole or notch at each revolution of the handle, or at every such motion thereof as would give to the film the amount of travel requisite for bringing a fresh picture (or, where pictures are to be taken, a fresh area of the sensitized film) into position opposite the aperture $c$. Or, other convenient step-by-step device may be used for the same purpose, such device, however, being preferably one that is adapted to give a click or other signal which can be either heard or felt or both by the operator so that he may know when the film has been moved forward a step or an amount corresponding to the length of film occupied by one picture.

The driving mechanism may be protected by a removable cover $g^{11}$ having holes through which the spindles $g^1$ $g^2$ $g^3$ project; and said cover if slightly resilient may be sprung into place over the ends of said spindles. It is preferably made of a non-resonant, sound-damping material such as papier-mâché so as to deaden the noise of the mechanism.

In the modified form of table shown in Figs. 10, 11, and 12, in place of the sunken recesses or depression $f^1$ shown in Figs. 1 to 4 and in Fig. 8, for the accommodation of the film holder, there are raised curbs or parapets $f^{11}$ $f^{11}$ which are curved to fit the ends of the kidney-shaped film holder E and which keep the same in place. The film guides are considerably modified: the conical dome $g^x$ shown in Figs. 1 to 4 and in Fig. 8 is dispensed with and in place thereof there is mounted a guide-plate $h^9$ forming an extension of the guide plate $h^2$ which plate $h^9$ in this instance is approximately triangular in shape and has its front face curved more or less parabolically from the edge toward the center so that the film can slide readily over it. This plate is recessed at $h^{14}$ and partly shrouds or guards the sprocket wheel. The movable guide member $h^1$ also carries a guide plate, or shield, $h^{10}$ which is bent forward or curved conversely to the guide plate $h^9$, that is to say with its convex side facing the curved side of the guide plate $h^9$, and which from its tallness and curvature acts as a shield to prevent the film when being put in from accidentally passing in front of it and also coöperates with the fixed guide $h^9$ in guiding the film downward into its place over the sprocket wheel $g$ and across the window $c$.

The arm $h^3$ of the movable guide member is, in this modified form, actuated directly by hand instead of through the intervention of the hand lever $h^6$ and link $h^4$ shown in connection with the other examples; and for this purpose its free end is prolonged to form a handle $h^{12}$. This handle $h^{12}$ engages, when at rest, with one or the other side of a stationary tooth or dog $f^{12}$ fixed in a suitable position on the table F, the handle being sufficiently resilient to be able, when shifted, to ride over the top of the tooth and spring into place on the other side thereof. The table F carries in this instance a guide roller $f^{13}$ on a fixed spindle suitably located for guiding the film $e$ as the latter emerges from between the guides $h^1$ $h^2$. This guide roller takes the place of the guide roller $e^5$ shown in Fig. 4 as carried by the film holder. If desired, a guide roller such as the one shown at $f^{13}$ in Fig. 10 may be used in connection with the form of the invention shown in Fig. 8, or with the form shown in Figs. 1 to 4, provided that, in the latter instance, the forward portion of the film holder is suitably shaped or cut away to make room for it, as for example as shown in Fig. 10.

$g^{13}$ (Fig. 10) is a reversing hand crank geared with one of the winding spindles for reversing or winding back the film.

The invention is not restricted to the use of any of the particular forms of table herein described: in fact the table or support need not be movable at all as stated, so long as there is provided some means of enabling the film holders with the films contained thereby or the spools to be put upon the table or support always in the same way, that is to say with the same side upward and the same edge toward the front, for all the different ways of using the apparatus, that is to say for projecting, for presenting to direct view or for taking, moving pictures or pictures of the magic lantern kind on films traveling in the direction either of the height or of the width of the picture: also, the winding will of course always be in the same direction. Moreover, there may, instead of one sprocket wheel $g$, be two such wheels, one on each side of the window $c$, the second sprocket wheel (namely the one on the right hand side looking in the direction of projection) serving to relieve or distribute the tension put upon the film by the driving and winding mechanism.

For taking pictures the apparatus is of course provided with an appropriate lens and means for closing the light aperture at the rear.

What I claim is:—

1. In optico-pictorial apparatus the combination of a lens, a support, means on said support adapted to receive and position a removable film holder, means for driving the film of said film holder past the lens and means for directing said film onto the driving means during the positioning of the film holder on its support.

2. In optico-pictorial apparatus the combination of a lens, a support, means on said support adapted to receive and position a removable film holder, means for guiding the film of said film holder in the correct position relatively to the lens, means for moving said film past the lens, and means for directing said film onto the driving means during the positioning of the film holder on its support.

3. In optico-pictorial apparatus the combination of a lens, a table-like support, means carried thereby adapted to receive and position a removable film holder, means for guiding the film of said holder in the correct position relatively to the lens, means for removing said film past the lens, and curved guides for directing said film on to the driving means during the positioning of the film holder on its support.

4. In optico-pictorial apparatus the combination of a lens, a table-like support, means carried thereby adapted to receive and position a removable film holder, means for guiding the film of said film holder in the correct position relatively to the lens, means for moving said film past the lens, and a fixed and a movable curved guide for directing said film on to the driving means during the positioning of the film holder on its support.

5. In optico-pictorial apparatus the combination of a lens, a source of light, a support for a film adapted to rotate about an axis, that is approximately coaxial with the lens, means for clamping a removable film holder on said support with the film normal to the axis of the lens and means for intermittently moving said film past the lens.

6. In optico-pictorial apparatus the combination of a lens, a support for a film said support being adapted to turn about an axis that is approximately co-axial with the lens, a film driving sprocket wheel on said support, means for guiding the film onto the said sprocket wheel when the film holder is placed on the support and means for intermittently moving said film past the lens.

7. In optico-pictorial apparatus the combination of a box or casing, a lens mounted in the wall of said box, a lantern or source of light mounted in the wall of said box and opposite to the lens, a table mounted so as to turn about an axis that is approximately co-axial with the lens, means for clamping a film holder on said table, and means for intermittently moving the film past said lens said means being mounted on said table.

8. In optico-pictorial apparatus the combination of a lens a table adapted to turn about an axis that is approximately co-axial with the lens, means adapted to accommodate a film on said table, a driving sprocket wheel, means for guiding said film over said sprocket wheel when the film is placed on said support and means for moving said film intermittently past said lens.

9. In optico-pictorial apparatus the combination of a lens a support adapted to turn about an axis that is approximately co-axial with the lens and having a recess for a film on one side thereof, a driving sprocket wheel, means for guiding a film over and on to said sprocket wheel, guiding means for holding said film on said sprocket wheel and means for turning said sprocket wheel intermittently to move the film past the lens.

10. In optico-pictorial apparatus the combination of a lens, a table having a recess on one side thereof for a film, a driving sprocket wheel on said table and adapted to engage a film, means for guiding said film on to said sprocket wheel, means for holding said film on said sprocket wheel and means for intermittently turning said sprocket wheel to move said film intermittently past the lens.

11. In optico-pictorial apparatus the combination of a lens, a table adapted to turn about an axis that is approximately co-axial with the lens, means for locking said table in various angular positions, a driving sprocket wheel adapted to engage a film, means for guiding said film on to said sprocket wheel, and means for intermittently turning said sprocket wheel to move said film intermittently past the lens.

12. In optico-pictorial apparatus the combination of a lens, a lantern, a table located between said lens and said lantern and adapted to turn about an axis that is approximately co-axial with the lens and the lantern, means for locking said table in various angular positions, means for clamping a film holder on said table, a driving sprocket wheel adapted to engage a film, means for guiding said film on to said sprocket wheel when the film holder is placed on the table and means for intermittently turning said sprocket wheel to move said film intermittently past the lens.

13. In optico-pictorial apparatus the combination of a lens, a lantern, a table located between said lens and said lantern and adapted to turn about an axis that is approximately co-axial with the lens and the lantern, means for locking said table in various angular positions, means for clamping a film holder on said table, a driving sprocket wheel adapted to engage a film, means for guiding said film on to said sprocket wheel when the film holder is placed on the support, means for holding said film on said sprocket wheel and means for intermittently turning said sprocket wheel to move said film intermittently past the lens.

14. In optico-pictorial apparatus the combination of a lens, a support for a film adapted to turn about an axis that is approximately co-axial with the lens, means for moving said film intermittently past the lens in one direction and means for returning the film in the opposite direction.

15. In optico-pictorial apparatus the combination of a lens, a support for a film approximately co-axial with the lens, means for clamping said film on said support means for moving the film in one direction past the lens and means for reversing the direction of movement of the film.

16. In optico-pictorial apparatus the combination of a lens a support adapted to turn about an axis that is approximately co-axial with the lens, means for clamping a film on said support, a driving sprocket wheel, means for guiding the film on to the sprocket wheel when the film is placed on the support, means for intermittently rotating said sprocket wheel to move the film intermittently past the lens, means for moving the film in one direction and means for moving the film in the opposite direction.

17. In optico-pictorial apparatus the combination of a lens, a table-like support, means for holding a film upon said support, a sprocket wheel, means for intermittently rotating said sprocket wheel, means for guiding said film on to said sprocket wheel as it is being placed on the support, a clamp for holding the film in engagement with the sprocket wheel, means for moving the film in one direction, means for moving the film in the reverse direction and means for moving the film clear of the sprocket wheel when the film is moved in the reverse direction.

18. In optico-pictorial apparatus the combination of a lens, a table-like support, means for holding a film holder on said support, a sprocket wheel, means for intermittently rotating said sprocket wheel, means for guiding a film on to said sprocket wheel as it is placed on the support, a spring pressed clamp for holding the film in engagement with the sprocket wheel, means for moving the film in one direction, means for moving the film in the opposite direction and means for automatically moving the film clear of the sprocket wheel when the film is moved in the reverse direction.

19. In optico-pictorial apparatus the combination of a lens, a table-like support, means for clamping a film on said support, a sprocket wheel on said support, means for intermittently rotating said sprocket wheel, means for guiding said film on to the sprocket wheel as it is placed on the support, means for holding said film in engagement with the sprocket wheel, means for moving the film in one direction, means for moving the film in the reverse direction, a reversing lever for effecting the reverse, a bell crank lever one arm of which is operatively connected to the reversing lever, and a roller carried by the other arm and disposed adjacent the film whereby as the reversing lever is operated the roller is caused to move into the path of the film and hold it clear of the sprocket wheel.

20. In optico-pictorial apparatus the combination of a lens, a film, a film holder comprising two spools, a support therefor adapted to turn about an axis that is approximately co-axial with the lens, means for clamping said holder on said support means for rotating the spools in one direction to move the film past the lens and means for reversing the direction of rotation of the spools.

21. In optico-pictorial apparatus the combination of a lens a film, a removable film holder comprising two spools, a support adapted to turn about an axis that is approximately co-axial with the lens, means for clamping said holder on said support, a driving sprocket wheel means for guiding the film on to the sprocket wheel when the holder is placed on the support, means for intermittently rotating said sprocket wheel to move the film intermittently past the lens, means for rotating the spools in one direction and means for rotating the spools in the opposite direction.

22. In optico-pictorial apparatus the combination of a lens, a film, a removable film holder comprising two spools, a table-like support approximately co-axial with the lens, means for clamping said film holder on said support, a sprocket wheel, means for intermittently rotating said sprocket wheel, means for guiding said film on to said sprocket wheel when the holder is placed on the support, a clamp for holding the film in engagement with the sprocket wheel, means for rotating the spools in one direction, means for rotating the spools in the reverse direction and means for moving the film clear of the sprocket wheel when the spools are rotated in the reverse direction.

23. In optico-pictorial apparatus the combination of a lens, a film, a removable film holder comprising two spools, a table-like support, means for holding said film holder on said support, a sprocket wheel, means for intermittently rotating said sprocket wheel, means for guiding said film on to said sprocket wheel when the holder is placed on the support, a spring pressed clamp for holding the film in engagement with the sprocket wheel, means for rotating the spools in one direction, means for rotating the spools in the opposite direction and means for automatically moving the film clear of the sprocket wheel when the spools are rotated in the reverse direction.

24. In optico-pictorial apparatus the combination of a lens, a film, a removable film holder comprising two spools, a support adapted to turn about an axis that is approximately co-axial with the lens, means for locking said support in various angular positions, means for clamping said film holder on said support, a sprocket wheel on said support, means for intermittently rotating said sprocket wheel, means for guiding said film on to the sprocket wheel when the holder is placed on the support, means for holding said film in engagement with the sprocket wheel, means for rotating the spools in one direction, means for rotating the spools in the reverse direction, a reversing lever for effecting the reverse, a bell crank lever one arm of which is operatively connected to the reversing lever, and a roller covered by the other arm and disposed adjacent the film whereby as the reversing lever is operated the roller is caused to move into the path of the film and hold it clear of the sprocket wheel.

In witness whereof I have hereunto set my hand in the presence of two subscribing witnesses.

FERDINAND von MADALER.

Witnesses:
E. CRUESMANN,
O. J. WORTH.